(12) United States Patent
Hasenfratz et al.

(10) Patent No.: US 11,731,067 B2
(45) Date of Patent: Aug. 22, 2023

(54) FILTER ELEMENT FOR FILTRATION AND DEHUMIDIFICATION OF A GAS

(71) Applicant: MANN+HUMMEL GmbH, Ludwigsburg (DE)

(72) Inventors: Robert Hasenfratz, Schwaebisch-Hall (DE); Andreas Franz, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 833 days.

(21) Appl. No.: 16/532,919

(22) Filed: Aug. 6, 2019

(65) Prior Publication Data

US 2020/0047103 A1    Feb. 13, 2020

(30) Foreign Application Priority Data

Aug. 7, 2018 (DE) ..................... 10 2018 119 220.7

(51) Int. Cl.
| | | |
|---|---|---|
| B01D 46/00 | (2022.01) | |
| B01D 46/10 | (2006.01) | |
| B01D 46/24 | (2006.01) | |
| B01D 53/04 | (2006.01) | |
| B01D 53/26 | (2006.01) | |
| B01D 46/62 | (2022.01) | |

(52) U.S. Cl.
CPC ..... *B01D 46/0036* (2013.01); *B01D 46/0005* (2013.01); *B01D 46/10* (2013.01); *B01D 46/2411* (2013.01); *B01D 46/62* (2022.01); *B01D 53/0415* (2013.01); *B01D 53/261* (2013.01); *B01D 2253/102* (2013.01); *B01D 2253/106* (2013.01); *B01D 2253/116* (2013.01); *B01D 2257/80* (2013.01); *B01D 2275/206* (2013.01); *B01D 2275/208* (2013.01)

(58) Field of Classification Search
CPC .............. B01D 46/0036; B01D 46/62; B01D 53/0415; B01D 53/261; B01D 46/0005; B01D 46/10; B01D 46/12; B01D 46/121; B01D 46/2411; B01D 2253/102; B01D 2253/106; B01D 2253/116; B01D 2257/80; B01D 2275/206; B01D 2275/208

See application file for complete search history.

(56) References Cited

U.S. PATENT DOCUMENTS 5,302,354 A * 4/1994 Watvedt ............ B01D 53/0446
210/493.1

FOREIGN PATENT DOCUMENTS

| DE | 102009050878 A1 | 4/2011 |
| DE | 102014018232 B3 | 10/2015 |
| DE | 102014018229 A1 | 6/2016 |
| DE | 102014018230 A1 | 6/2016 |

(Continued)

*Primary Examiner* — Robert Clemente (57) ABSTRACT

A filter element for filtration and dehumidification of a gas has at least one filter medium body with an outflow side delimiting a clean-side flow chamber. A dehumidification unit is arranged downstream of the at least one filter medium body in a flow direction of the gas in the clean-side flow chamber. A carrier body accommodates the at least one filter medium body and the dehumidification unit. The dehumidification unit is connected flow-tightly to an outflow opening of the clean-side flow chamber. The dehumidification unit is arranged in the clean-side flow chamber at a spacing relative to the at least one filter medium body.

19 Claims, 5 Drawing Sheets

(56) References Cited

FOREIGN PATENT DOCUMENTS

| | | | |
|---|---|---|---|
| DE | 102014018231 | A1 | 6/2016 |
| DE | 102016110962 | A1 | 12/2016 |
| EP | 2533346 | A1 | 12/2012 |
| EP | 2547422 | B1 | 1/2013 |

* cited by examiner

FILTER ELEMENT FOR FILTRATION AND DEHUMIDIFICATION OF A GAS

BACKGROUND OF THE INVENTION

The invention relates to a filter element for filtration and dehumidification of a gas, comprising at least one filter medium body, a dehumidification unit arranged downstream of the filter medium body in flow direction of the gas, and a carrier body accommodating the filter medium body and the dehumidification unit.

CN 106853303 A describes a filter element that comprises, in a housing with an inflow opening and an outflow opening, three filter layers which are arranged immediately resting on each other in the housing and are flowed through by air. The first filter layer forms a particle filter, the second filter layer comprises silica gel particles for dehumidification, and the third filter layer is provided with a honeycomb structure into which antibacterial material is introduced.

DE 198 48 446 C1 discloses a filter element that is positioned adjacent to an inflow opening in a battery box for electrochemical storage devices arranged therein. The filter element comprises two filter layers arranged at a slant and immediately resting on each other which are flowed through by cooling air. Contaminations in the cooling air are separated at the filter layers; also, the filter layers develop a drainage effect for separated moisture or liquid entrained in the cooling air.

SUMMARY OF THE INVENTION

It is the object of the invention to embody a filter element for filtration and dehumidification of a gas with simple constructive measures in such a way that the filtration and dehumidification of the gas can be performed efficiently and space-savingly.

This object is solved according to the invention in that the dehumidification unit is arranged in a clean-side flow chamber which is delimited by the outflow side of the filter medium body, wherein the dehumidification unit is connected flow-tightly to an outflow opening of the flow chamber, and in that the dehumidification unit in the clean-side flow chamber is arranged at a spacing relative to the filter medium body.

The dependent claims provide expedient further developments.

The filter element according to the invention can be used for filtration and dehumidification of a gas that, for example, is used for cooling a battery which is located in a vehicle, for example. In a further exemplary application, the filter element can be employed for venting a compensation tank that provides for pressure compensation with the atmosphere, for example, for transmission coolant. The filter element comprises a carrier body, at least one filter medium body at which the filtration of the gas takes place, as well as a dehumidification unit for dehumidifying the gas. The filter medium body and the dehumidification unit, relative to the flow direction, are arranged in series or behind one another, wherein first the filter medium body and downstream thereof the dehumidification unit is flowed through by the gas. Accordingly, the dehumidification unit is arranged downstream in flow direction in the filter medium body. The carrier body is carrier of the filter medium body as well as—directly or indirectly—of the dehumidification unit.

The filter medium body comprises a raw or inflow side and a clean or outflow side wherein the outflow side, through which the gas from which particles have been removed exits from the filter medium body, is at the same time a boundary wall for a clean-side flow chamber in the filter element. The dehumidification unit is arranged in the clean-side flow chamber; it is positioned at a spacing to the filter medium body so that within the clean-side flow chamber a flow chamber that is shielded relative to the environment is provided between the outflow side of the filter medium body and the inflow side of the dehumidification unit.

The flow chamber between the filter medium body and the dehumidification unit makes it possible for the gas from which particles have been removed to spread within this chamber and to flow through the dehumidification unit via inflow openings which are provided in a housing of the dehumidification unit. In the chamber between the filter medium body and the dehumidification unit, calming of the gas flow takes place, combined with a reduction of the flow rate, which has an advantageous effect in regard to the filtration efficiency and adsorption efficiency in the dehumidification unit and provides for a longer contact time in the dehumidification unit.

The dehumidification unit has primarily the function of adsorbing moisture entrained in the gas at a drying agent. Conversely, it can also be advantageous that the water stored in the drying agent is easily desorbed again at very low air humidity. It is thus ensured that the gas comprises a desired degree of humidity between a lower and an upper limit. Thus, a so-called humidifying and dehumidifying unit is provided.

A further advantage of the embodiment according to the invention of the filter element for filtration and dehumidification of a gas resides in the spatial separation of filter medium body and dehumidification unit. This makes it possible to embody both as pre-manufactured components which are combined in the carrier body. Moreover, it is possible to exchange, as needed, the units independent of each other, for example, to exchange the dehumidification unit and to leave the filter medium body in the filter element, or vice versa.

In order to avoid leakage flows, the dehumidification unit is flow-tightly connected to an outflow opening of the flow chamber. In this way, it is ensured that the gas, after having flowed through the filter medium body, is forced to flow also through the dehumidification unit prior to the gas exiting from the filter element via the outflow opening of the flow chamber.

According to an advantageous embodiment, the dehumidification unit is embodied as a cylindrical dehumidification cartridge. The cartridge is provided with a housing in which are provided the at least one inflow opening for the gas and an outflow opening that is connected to the outflow opening of the flow chamber or coincides with the outflow opening of the flow chamber. In the housing of the dehumidification cartridge, a drying agent is provided for dehumidification, for example, a filling of silica gel or a molecular sieve. Alternatively, also a liquid or gaseous drying agent in the form of an adsorption agent is conceivable in combination with a membrane in the dehumidification cartridge. Moreover, also a cartridge with active carbon is conceivable in order to remove, in addition, harmful chemical substances from the gas.

Across the axial length of the dehumidification unit, a plurality of inflow openings can be provided in the housing. Via the inflow openings, it is thus possible to supply the gas to the drying agent in the dehumidification unit across the entire or a large portion of the flow chamber between filter medium body and dehumidification unit. The size of the openings can extend gradiently for a pressure loss as minimal as possible with full flow being provided at the same time.

In an alternative embodiment, it is provided that the housing of the dehumidification unit comprises one or a plurality of inflow openings only adjacent to the end positioned opposite the outflow opening, in particular in the housing bottom. This embodiment has the advantage that gas entering the dehumidification unit is forced to flow through the dehumidification unit across its entire axial length so that a maximum dehumidification can be realized in the drying agent. For example, it may be expedient to provide a plurality of inflow openings, distributed about the circumference, in the housing of the dehumidification unit adjacent to the end positioned opposite the outflow opening. At the inner side of the cartridge housing, an injection-molded strainer shell that, for example, has a mesh width of 500 micrometers can be arranged in order to enable also the use of very fine grain bulk material.

According to a further advantageous embodiment, the dehumidification unit is held at the carrier body and connected fixedly or detachably to the carrier body. For example, it can be expedient to manufacture the carrier body, which accommodates also the filter medium body, as an injection-molded plastic component and to produce also the housing of the dehumidification unit as an injection-molded plastic component, in particular as one piece together with the carrier body. Alternatively, it is however also possible to configure carrier body and dehumidification unit as separate components but to connect the dehumidification unit in the mounted state of the filter element to the carrier body, for example, by a plug connection or snap connection. The last mentioned embodiment makes it possible to exchange, as needed, the dehumidification unit and to leave the particle filter or filter medium body in the filter element.

According to a further alternative embodiment, the dehumidification unit is held at an adapter part and is connected fixedly or detachably to the adapter part that can be placed onto the outflow opening of the flow chamber. The outflow opening in the flow chamber is located in particular at the carrier body so that the adapter part is also held at the carrier body. The adapter part makes it possible to produce a flow connection between the filter element and a continuative tube member that differs in shape and/or size from the outflow opening of the flow chamber.

The adapter part is advantageously embodied as an injection-molded plastic component to which the dehumidification unit is connected fixedly or detachably. It is, for example, possible to produce a housing of the dehumidification unit as one piece with the adapter part in the same injection molding process. Alternatively, it can also be expedient to embody the adapter part and the dehumidification unit as separate components and to connect the housing of the dehumidification unit in a suitable way to the adapter part, for example, by a plug connection, snap connection or weld connection. Moreover, it is possible to connect the adapter part detachably to the carrier body, for example, also by means of a plug connection or snap connection.

In yet another advantageous embodiment, the adapter part is connectable to the carrier body but the dehumidification unit is connected, independent of the adapter part, fixedly or detachably to the carrier body.

According to a further advantageous embodiment, the filter element is provided with a bypass for partially or completely bypassing the dehumidification unit. The bypass is embodied to be switchable and can be adjusted between an open bypass position and a closure position. In the open bypass position, the gas can be discharged immediately through the bypass from the flow chamber, by bypassing the dehumidification unit; in contrast thereto, the bypass is closed in the closure position and the gas is forced to flow through the dehumidification unit.

The bypass, according to a further advantageous embodiment, is formed in or at the adapter part that is attachable to the outflow opening of the flow chamber. The adapter part can be adjusted between the bypass position and the closure position, wherein the closure position and the bypass position advantageously each are embodied as a locking position. The adapter part can be pushed, for example, in longitudinal direction—relative to the longitudinal axis of the dehumidification unit—into two different locking positions on the carrier body that represent the bypass position and the closure position. In the bypass position, for example, a sealing ring that is arranged at the adapter part is positioned at a spacing to the wall surface of the housing of the dehumidification unit so that, along the wall surface of the housing of the dehumidification unit, a bypass for discharging the gas from the flow chamber by bypassing the dehumidification unit is formed. In the closure position, on the other hand, the sealing ring is resting flow-tightly on the wall surface of the housing of the dehumidification unit.

According to a further advantageous embodiment, the filter medium body is embodied as a flat filter body that preferably has a parallelepipedal shape. The flat filter body can be embodied as a folded filter body. It can be also expedient to arrange at the carrier body two oppositely positioned filter medium bodies that are each embodied as a flat filter body and enclose between them the clean-side flow chamber with the dehumidification unit. The two flat filter bodies in this context can be arranged mirror-symmetrical to each other relative to a center plane. Alternatively, also an unsymmetric embodiment with same or different size of the two flat filter bodies is possible.

The clean-side flow chamber can be additionally closed off, as needed, relative to the at least one outflow side of the filter medium body by one or a plurality of walls of the carrier body in a flow-tight manner so that a chamber that is closed relative to the environment is formed from which the gas can flow out only through the outflow opening.

The two oppositely positioned flat filter bodies can be arranged parallel to each other or arranged at an angle relative to each other. It can also be advantageous to provide more than two filter medium bodies, each embodied as a flat filter body, in the filter element. Moreover, it is also possible to arrange precisely one or precisely two flat filter bodies in the filter element.

In an alternative embodiment, the filter element is embodied as a round filter element or oval filter element and comprises a hollow cylindrical or substantially hollow cylindrical filter medium body with oval or ovalized cross section shape whose interior forms the clean-side flow chamber in which the dehumidification unit is arranged at a spacing to the inner wall of the filter medium body. Flow through the cylindrical or substantially hollow cylindrical filter medium body is realized radially from the exterior to the interior—relative to the longitudinal axis of the filter medium body—so that the inner wall forms the outflow side of the filter medium body. The outflow of the gas from the filter element is realized in axial direction after flow through the dehumidification unit. In a further alternative embodiment, the filter element is embodied as a U filter and comprises a horseshoe-shaped bent flat filter body.

The invention relates furthermore to a filter device with an afore described filter element and with a filter housing in which the filter element is received.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

In FIGS. 1 to 4, a first embodiment of a filter element for filtration and dehumidification of a gas, for example, air, is illustrated wherein the gas, after filtration and dehumidification, can be used, for example, for cooling a battery in a vehicle. The filter element 1 comprises a plastic carrier body 2 with two lateral receiving pockets 2a, 2b (FIG. 4) in which a filter medium body is received, respectively, that is embodied as a flat filter body 3, 4. Each flat filter body 3, 4 is of a folded shape and has a parallelepipedal shape. The carrier body 2 can be produced, for example, by a plastics injection molding process. The flat filter bodies 3, 4 are flowed through from the exterior to the interior by the gas so that the exterior side is the inflow or raw side 3a, 4a and the inner side is the outflow or clean side 3b, 4b.

The outflow sides 3b, 4b delimit an inwardly positioned clean-side flow chamber 8 which is closed off relative to the environment and can be only accessed by flow through the flat filter bodies 3, 4. Within the flow chamber 8, there is a dehumidification unit which is embodied as a dehumidification cartridge 5 and comprises a cylindrical cartridge housing 6 with a drying agent 7 received therein, for example, a granular filling of silica gel. The dehumidification cartridge 5 is arranged downstream of the flat filter bodies 3, 4 in flow direction of the gas; it is arranged in series with the flat filter bodies so that, in flow direction, first the two flat filter bodies 3, 4 and subsequently the dehumidification cartridge 5 are flowed through by the gas.

An axial end face of the dehumidification cartridge 5 projects from an outflow opening 9 which is formed in the carrier body 2; through this outflow opening 9 the gas is discharged from the filter element 1 after having flowed through the dehumidification cartridge 5. The outflow opening 9 is located in a housing connector 10 which is embodied as one piece together with the carrier body 2 and through which the filter element can be connected to a continuative tube conduit or the like.

The cartridge housing 6 is embodied as one piece together with the carrier body 2; carrier body 2 and cartridge housing 6 in particular form a common injection-molded plastic component. Adjacent to an axial end—relative to the longitudinal axis of the cartridge housing—that is opposite the outflow opening 9, a plurality of inflow openings 11, distributed about the circumference, are provided in the cartridge housing 6; through the inflow openings 11, the gas can enter the dehumidification cartridge 5. Subsequently, the gas flows through the drying agent 7 which is disposed in the cartridge housing 6, and exits the dehumidification cartridge 5 through the outflow opening 9 which at the same time forms the outflow opening in the cartridge housing 6.

The dehumidification cartridge 5 is dimensioned such that between the outflow sides 3b, 4b of the flat filter body 3, 4 and the outer wall of the cartridge housing 6, a spacing is provided so that a flow chamber, surrounding the cartridge housing 6, is formed for the gas in the clean-side flow chamber 8. Accordingly, the gas can spread along the entire outflow side 3b, 4b of the flat filter body 3, 4 in the clean-side flow chamber 8, and calming of the flow is achieved. In this way, the flow rate is reduced which is advantageous with regard to the filtration efficiency and adsorption efficiency in the flat filter bodies 3, 4 and in the dehumidification cartridge 5.

The clean-side flow chamber 8 is provided with chamber walls which are part of the carrier body 2 and extend between the oppositely positioned receiving pockets 2a, 2b with the flat filter bodies 3, 4 received therein. This ensures that only a flow through the flat filter bodies 3, 4 is possible from the exterior to the interior and leakage flows are prevented. The carrier body 2 is also flow-tightly embodied in the region opposite the housing connector 10.

A screen 12 is placed onto the outflow opening 9 in the carrier body 2 or the outflow opening in the dehumidification cartridge 5.

In FIGS. 5 to 8, a further embodiment of a filter element is illustrated which corresponds substantially to the first embodiment. In the second embodiment according to FIGS. 5 to 8, an adapter part 13 which is attached to the outflow opening 9 is however connectable to the filter element 1 by insertion. By means of the adapter part 13, a connection to the tube members or the like is possible which have a different diameter and/or a different cross section geometry compared to the outflow opening 9. For a flow-tight connection between the adapter part 13 and the outflow opening 9, an annular sealing element 14 is applied to the socket of the carrier body 2 onto which the adapter part 13 is pushed. The sealing element 14 comprises a groove structure in order to improve the connection with the adapter part 13.

In FIGS. 9 to 12, a further embodiment of a filter element 1 for filtration and dehumidification of a gas is illustrated that, as in the preceding embodiments, comprises a plastic carrier body 2 with two oppositely positioned receiving pockets 2a, 2b for receiving a flat filter body 3, 4, respectively. In the clean-side flow chamber 8 which is located between the flat filter bodies 3, 4, by means of the outflow opening 9 a dehumidification cartridge 5 is insertable which is connected to an adapter part 13. The adapter part 13 is attachable to the outflow opening 9 and is to be connected to the carrier body 2. The cartridge housing 6 of the dehumidification cartridge 5 is connected fixedly to the adapter part 13.

The cartridge housing 6 comprises inflow openings that are distributed across its entire axial length as well as across the circumference.

In the embodiment according to FIGS. 13 to 16, the filter element 1 is provided with the same basic construction as in the preceding embodiments and comprises a carrier body 2 with two oppositely positioned receiving pockets 2a, 2b for receiving a flat filter body 3, 4, respectively, that enclose between them the clean-side flow chamber 8. In this clean-side flow chamber 8 there is a dehumidification cartridge 5 that is connected fixedly to the carrier body 2. Advantageously, the cartridge housing 6 and the carrier body 2 form a common injection-molded plastic component. In order to provide a flow-tight connection between the adapter part 13 and the dehumidification cartridge 5, the adapter part 13 comprises at its inner side a sealing ring 15 (FIGS. 13, 14) that, when pushing the adapter part 13 onto the dehumidification cartridge 5 (transition from FIG. 13 to FIG. 14), is pushed onto the exterior wall surface of the cartridge housing 6. In this way, it is ensured that leakage flows past the dehumidification cartridge 5 are prevented and the gas, which collects in the clean-side flow chamber 8 in the filter element 1 after having flowed through the flat filter bodies 3, 4, flows through the dehumidification cartridge 5.

Figure 1:
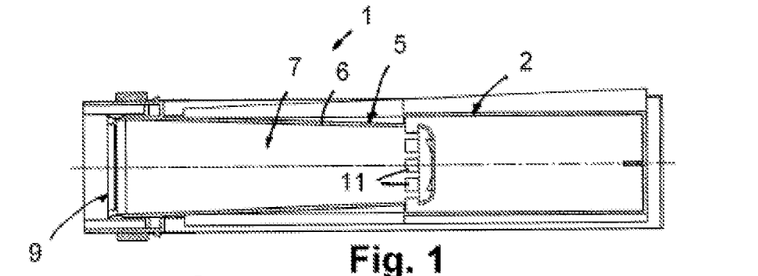
FIG. 1 is a longitudinal section of the filter element that can be used for filtration and dehumidification of a gas, in particular air, with two flat filter bodies which are arranged at a carrier body, and with a dehumidification cartridge with the flat filter bodies.
Figure 2:
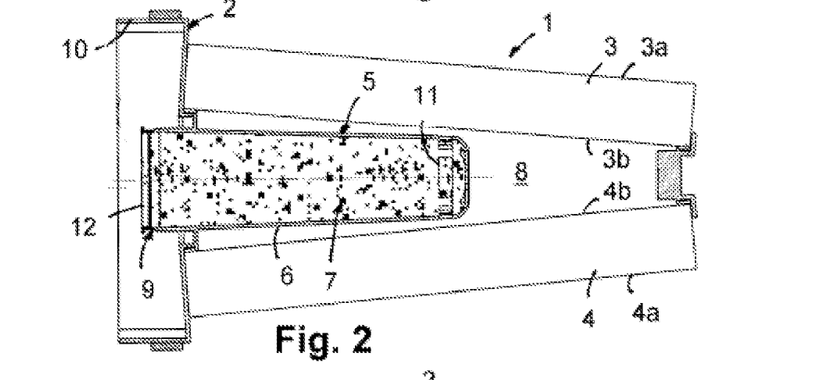
FIG. 2 shows the filter element in a further section that is displaced by a 90° angle.
Figures 3, 4:
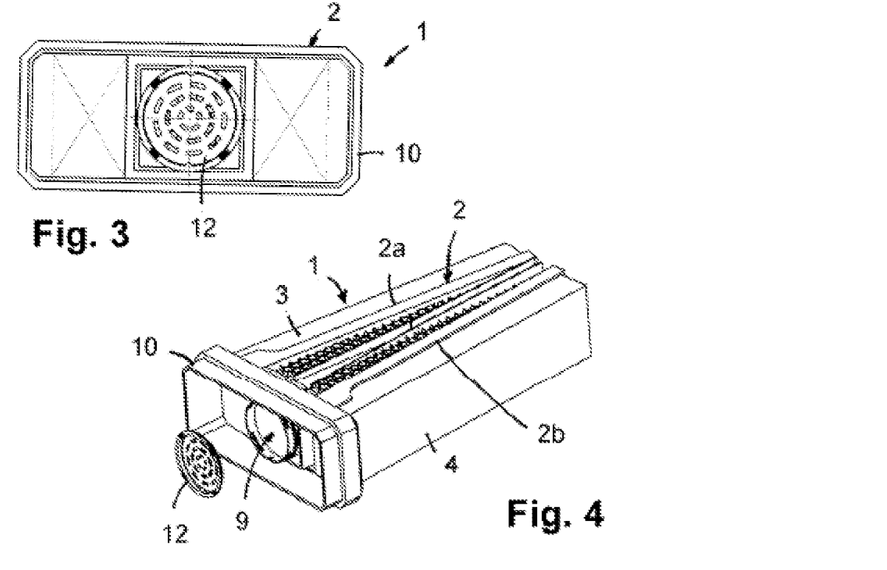
FIG. 3 shows the filter element in a view from the front.
FIG. 4 shows the filter element in a perspective view.
Figure 5:
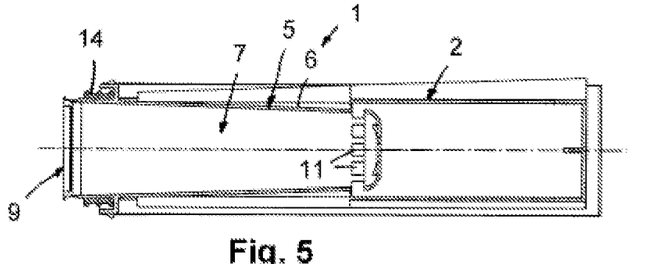
FIG. 5 shows a filter element in an embodiment variant with an additional adapter part that can be attached to an outflow opening.
Figure 6:
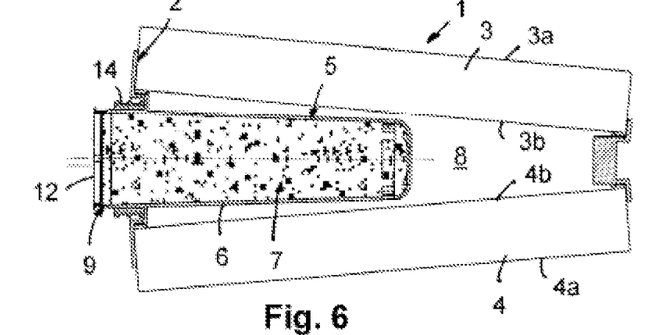
FIG. 6 shows the filter element of FIG. 5 in a further section that is displaced by a 90° angle.
Figure 7:
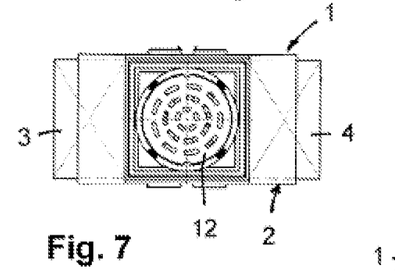
FIG. 7 shows the filter element of FIG. 5 in a view from the front.
Figure 8:
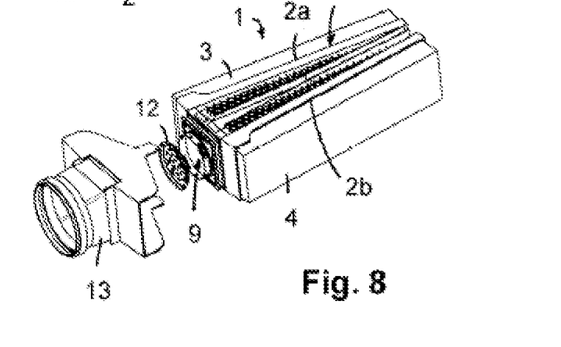
FIG. 8 shows the filter element of FIG. 5 in a perspective view.
Figures 9, 10, 11, 12, 13, 14:
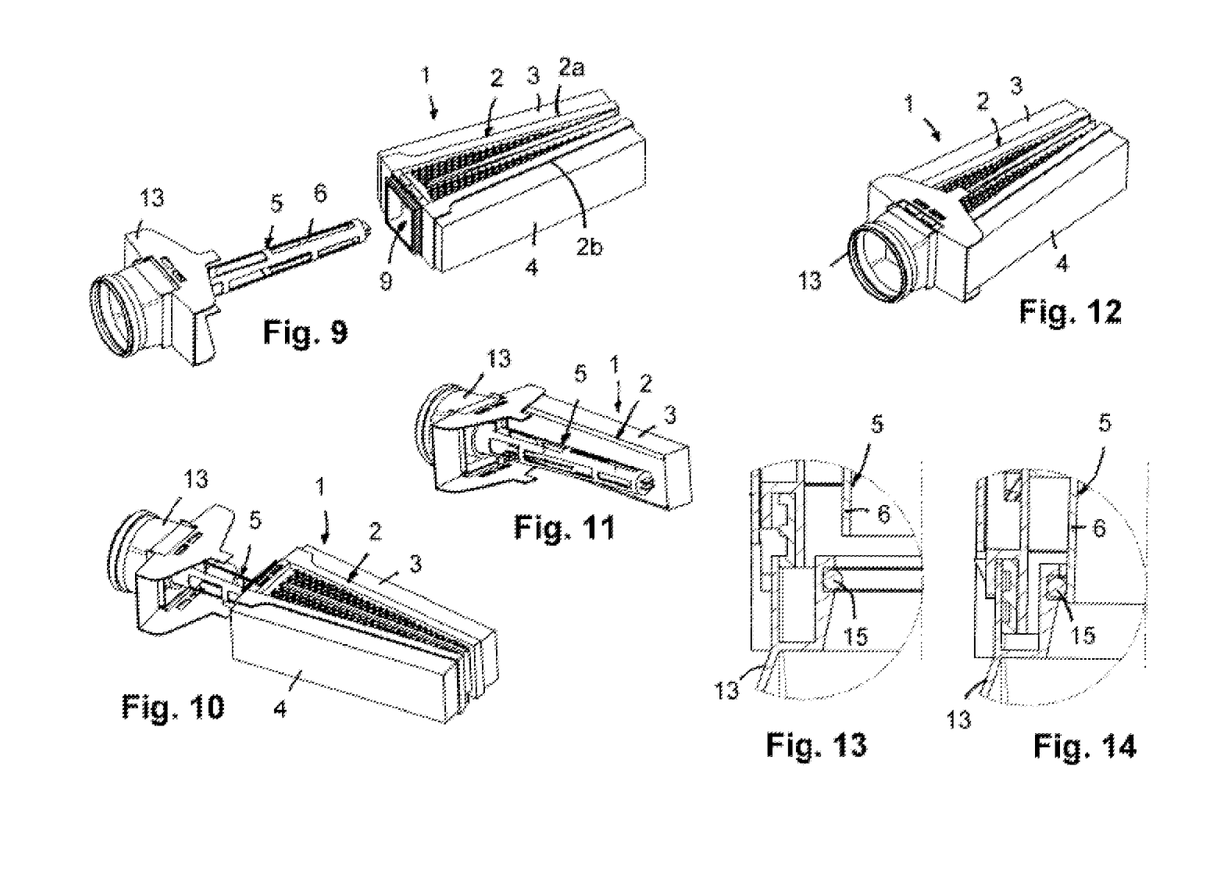
FIG. 9 shows a filter element in a further embodiment variant in which a dehumidification cartridge is held at an adapter part.
FIG. 10 shows the filter element of FIG. 9 in a further perspective illustration.
FIG. 11 shows the filter element of FIG. 9 with inserted dehumidification cartridge, partially in section.
FIG. 12 is a perspective illustration of the finish-mounted filter element of FIG. 9.
FIG. 13 shows in section a detail illustration of the connection between adapter part and dehumidification cartridge during the assembly.
FIG. 14 is an illustration corresponding to FIG. 13 but with the adapter part and the dehumidification cartridge in flow-tight connection.
Figure 15:
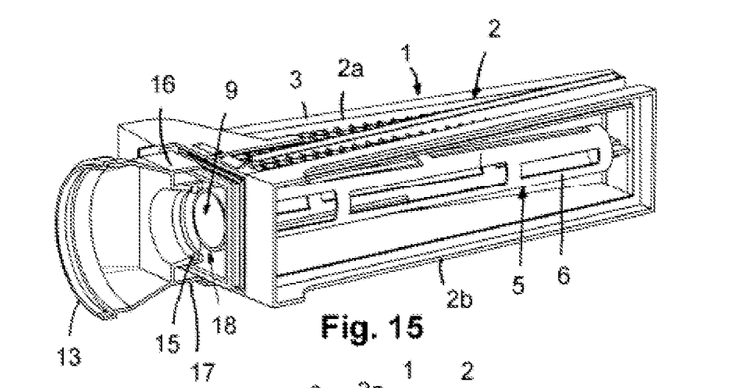
FIG. 15 shows in perspective illustration a further embodiment of a filter element with an adapter part in which a switchable bypass is integrated, illustrated in an open bypass position.

An adapter part 13 can be pushed onto the carrier body 2 and is to be brought into flow-tight connection with the outflow opening 9 through which the gas can flow out of the dehumidification cartridge 5. The adapter part 13 comprises an upper and a lower connecting section 16 and 17, each comprising a U shape, and can be brought into two different locking positions with the carrier body 2. In the first locking position, which is illustrated in FIGS. 13 and 15, the adapter part 13 is pushed only partially onto the carrier body 2; this first locking position represents a bypass position. In this position, not completely pushed on the carrier body 2, a bypass 18 between the externally positioned wall surface of the cartridge housing 6 and the adapter part 13 is open through which the gas can flow out of the clean-side flow chamber 8 through the adapter part 13 by bypassing the dehumidification cartridge 5. In the bypass position, a sealing ring 15 arranged on the adapter part 13 is positioned at a spacing relative to the cartridge housing 6.

Figure 16:
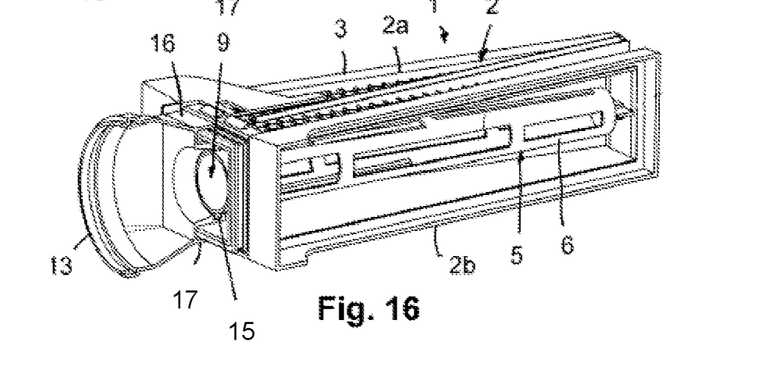
FIG. 16 shows the filter element of FIG. 15 with the adapter part in a closure position closing off the bypass.
Figure 17:
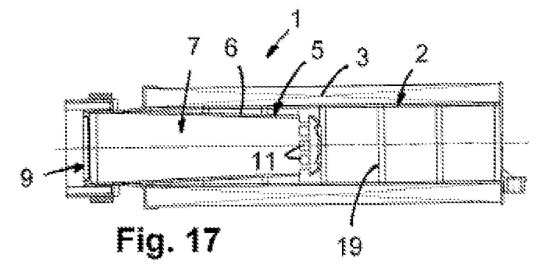
FIG. 17 shows a filter element in a further embodiment variant with a filter medium body in ovalized cross section shape.
Figure 18:
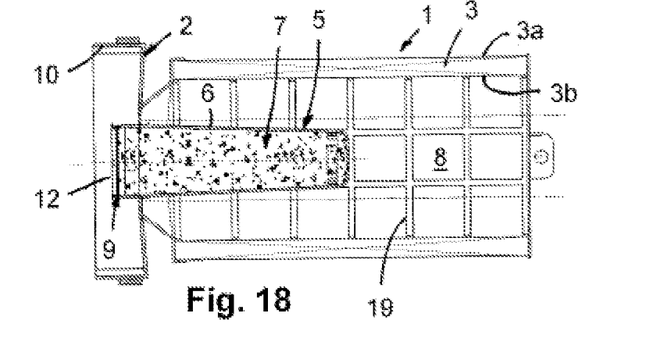
FIG. 18 shows the filter element of FIG. 17 in a further section that is displaced by a 90° angle.
Figure 19:
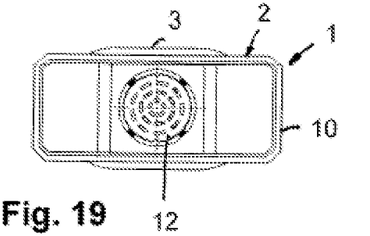
FIG. 19 shows the filter element of FIG. 17 in a view from the front.
Figure 20:
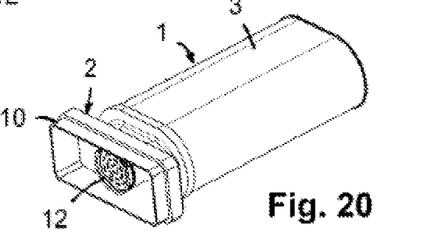
FIG. 20 shows the filter element of FIG. 17 in a perspective view.

In the second locking position, illustrated in FIGS. 14 and 16, the adapter part 13 is completely pushed onto the carrier body 2 and assumes its closure position in which the sealing ring 15 is pushed onto the wall surface of the cartridge housing 6 and the bypass is closed. In this closure position with closed bypass, the gas which collects in the clean-side flow chamber 8 is forced to flow through the dehumidification cartridge 5.

The embodiment according to FIGS. 17 to 20 corresponds substantially to the first embodiment according to FIGS. 1 to 4; therefore, the basic configuration of the filter element 1 with the dehumidification cartridge 5 with cartridge housing 6 and drying agent 7 at the clean side of the filter medium body 3 is identical to the first embodiment.

Different is however the configuration of the filter medium body 3 which is embodied as a round or oval filter element with an annular circumferentially extending flow cross section in the FIGS. 17 to 20. The cross section shape of the filter medium body 3 is ovalized with part-circular narrow sides and flattened longitudinal sides. The flow through the filter medium body 3 is realized in radial direction from the exterior to the interior so that the exterior side of the filter medium body 3 forms the inflow side 3a and the inner side forms the outflow side 3b. As a result of the embodiment as a round or oval filter element, it is sufficient to provide only a single filter medium body 3. At its inner side, the filter medium body 3 comprises a support frame 19 which imparts stability to the filter medium body 3.

While specific embodiments of the invention have been shown and described in detail to illustrate the inventive principles, it will be understood that the invention may be embodied otherwise without departing from such principles.

What is claimed is:

1. A filter element for filtration and dehumidification of a gas, the filter element comprising:
    at least one filter medium body comprising an outflow side delimiting a clean-side flow chamber;
    a dehumidification unit arranged downstream of the at least one filter medium body in a flow direction of the gas in the clean-side flow chamber;
    a carrier body accommodating the at least one filter medium body and the dehumidification unit;
    wherein the dehumidification unit is connected flow-tightly to an outflow opening of the clean-side flow chamber;
    wherein the dehumidification unit is arranged in the clean-side flow chamber at a spacing relative to the at least one filter medium body; and
    wherein the carrier body is a frame positioned proximate to and at least partially along the outflow side of the at least one filter medium body.

2. The filter element according to claim 1, wherein the dehumidification unit is a cylindrical dehumidification cartridge.

3. The filter element according to claim 1, wherein the dehumidification unit comprises a housing, wherein the housing of the dehumidification unit comprises one or more inflow openings and an outflow opening, wherein the outflow opening of the housing of the dehumidification unit is connected to the outflow opening of the flow chamber, wherein the dehumidification unit comprises a drying agent accommodated in the housing of the dehumidification unit.

4. The filter element according to claim 3, wherein the housing of the dehumidification unit comprises a plurality of the inflow openings distributed across an axial length of the dehumidification unit.

5. The filter element according to claim 3, wherein the housing of the dehumidification unit comprises a plurality of the inflow openings arranged only adjacent to an end of the dehumidification unit opposite the outflow opening of the housing of the dehumidification unit.

6. The filter element according to claim 1, wherein the dehumidification unit is held at the carrier body and is connected fixedly or detachably to the carrier body.

7. The filter element according to claim 1, further comprising an adapter part attachable to the outflow opening of the clean-side flow chamber, wherein the dehumidification unit is held at the adapter part and is connected fixedly or detachably to the adapter part.

8. The filter element according to claim 1, further comprising an integrated switchable bypass for partial or complete bypassing of the dehumidification unit.

9. The filter element according to claim 8, wherein the switchable bypass is formed in or at an adapter part attachable to the outflow opening of the flow chamber.

10. The filter element according to claim 1, wherein the at least one filter medium body is a flat filter body.

11. The filter element according to claim 1, wherein two of the at least one filter medium body are provided and positioned opposite each other, wherein the two filter medium bodies are two flat filter bodies, wherein the clean-side flow chamber with the dehumidification unit is positioned between the two flat filter bodies.

12. The filter element according to claim 1, wherein the filter element is a round filter element or an oval filter element and the at least one filter medium body is a hollow cylindrical or substantially hollow cylindrical filter medium body comprising an interior forming the clean-side flow chamber, wherein the dehumidification unit is arranged in the interior.

13. The filter element according to claim 1, wherein the filter element is a U filter, wherein the at least one filter medium body is a horseshoe-shaped bent flat filter body comprising an inner side, wherein the clean-side flow chamber is provided at the inner side of the horseshoe-shaped bent flat filter body, wherein the dehumidification unit is arranged in a region defined between legs of the horseshoe-shaped bent flat filter body.

14. The filter element according to claim 1, further comprising two or more adsorber inserts arranged in an interior of the carrier body for simultaneous use of different adsorbents.

15. The filter element according to claim 14, wherein the adsorbents are selected from the group consisting of silica gel, molecular sieve, and active carbon.

16. The filter element according to claim 1, wherein the axis of the outflow opening of the clean-side flow chamber extends parallel or coaxially to a center axis of the filter element.

17. A filter device comprising a filter element according to claim 1 and a filter housing, wherein the filter element is arranged in the filter housing.

18. A filter element for filtration and dehumidification of a gas, the filter element comprising:
  at least one filter medium body comprising an inlet flow side and an outflow side, the outflow side delimiting a clean-side flow chamber;
  a dehumidification unit arranged downstream of the at least one filter medium body in a flow direction of the gas in the clean-side flow chamber;
  a carrier frame accommodating the at least one filter medium body and the dehumidification unit;
  wherein the inlet flow side includes an inlet flow face, at least a portion of the inlet flow face arranged external to the carrier frame;
  a dehumidification unit arranged downstream of the at least one filter medium body in a flow direction of the gas in the clean-side flow chamber;
  wherein the dehumidification unit is connected flow-tightly to an outflow opening of the clean-side flow chamber; and
  wherein the dehumidification unit is arranged in the clean-side flow chamber at a spacing relative to the at least one filter medium body.

19. A filter element for filtration and dehumidification of a gas, the filter element comprising:
  at least one filter medium body comprising an outflow side delimiting a clean-side flow chamber;
  a dehumidification unit arranged downstream of the at least one filter medium body in a flow direction of the gas in the clean-side flow chamber;
  a carrier body accommodating the at least one filter medium body and the dehumidification unit;
  wherein the dehumidification unit is connected flow-tightly to an outflow opening of the clean-side flow chamber;
  wherein the dehumidification unit is arranged in the clean-side flow chamber at a spacing relative to the at least one filter medium body; and
  an adapter part attachable to the outflow opening of the clean-side flow chamber, wherein the dehumidification unit is held at the adapter part and is connected fixedly or detachably to the adapter part.

* * * * *